United States Patent [19]
Porazinski

[11] 3,893,744
[45] July 8, 1975

[54] BATTERY TERMINAL CLAMP
[75] Inventor: Julius Porazinski, Chicago, Ill.
[73] Assignee: Triple A Specialty Co., Chicago, Ill.
[22] Filed: Jan. 2, 1974
[21] Appl. No.: 429,762

[52] U.S. Cl. .......................... 339/230 R; 339/265 R
[51] Int. Cl.² ......................................... H01R 11/26
[58] Field of Search ..................... 339/224–241, 339/265

[56] References Cited
UNITED STATES PATENTS
| | | | |
|---|---|---|---|
| 2,039,669 | 5/1936 | Tenney | 339/265 R X |
| 2,161,692 | 6/1939 | Andre | 339/230 R |
| 2,841,774 | 7/1958 | Romanek | 339/237 |
| 3,407,383 | 10/1968 | Haegert | 339/230 R |

OTHER PUBLICATIONS
Electrical World, "Terminal Lugs," p. 82, May 8, 1961.

*Primary Examiner*—Roy D. Frazier
*Assistant Examiner*—Lawrence J. Staab
*Attorney, Agent, or Firm*—Edward C. Threedy

[57] ABSTRACT

A battery terminal post cable clamp made from a highly conductive material, preferably lead, and having a metallic clamping plate adapted to threadably receive connecting bolts, the shanks of which are freely journaled through suitable apertures formed in the cable-receiving tail portion of the clamp body. As the clamping bolts thread directly into the cable-retaining clamping plate, no nuts are required, and cables having different diameters can readily be attached to either the top or bottom surfaces of the cable-receiving tail portion of the clamp body.

1 Claim, 5 Drawing Figures

PATENTED JUL 8 1975   3,893,744

BATTERY TERMINAL CLAMP

SUMMARY OF THE INVENTION

In prior art battery terminal clamps, a cable-connecting plate was positioned on the laterally extending tail portion of the clamp so as to embrace the electrical cable and hold the same onto the clamp. The more highly conductive the clamp, the better the connection between it and the battery and the cable, a result obtained through the use of expensive metals. To overcome the objectionable use of expensive metals resulted in cable clamps being made of lead. However, lead, being a semi-soft pliable metal, required the use of nuts and bolts to clamp a clamping plate thereon for holding the cable attached thereto. These bolts could not be threaded into the body of the clamp and thus required the use of nuts, increasing the costs of such clamps.

One object of the present invention is the construction of a lead cable clamp, utilizing a hard metallic clamping plate having the strength to threadably receive the bolts that position the clamping plate onto the clamp body. By the use of a clamping plate constructed from a hard metal, the plate itself may be threaded so as to receive the connecting bolts which are freely journalled in suitable apertures formed in the clamp body, giving the clamp the added feature of permitting the clamping plate to be connected to either the top or bottom surface of a portion of the clamp body to receive and attach thereto electrical cables of varying diameters.

The invention will be best understood by reference to the accompanying drawings, which show the preferred embodiment of the invention, and in which.

Figure 1:
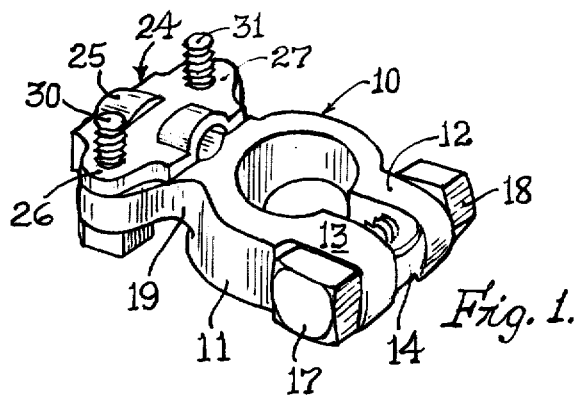
FIG. 1 is a perspective view of the battery terminal clamp.
Figures 2, 3, 5:
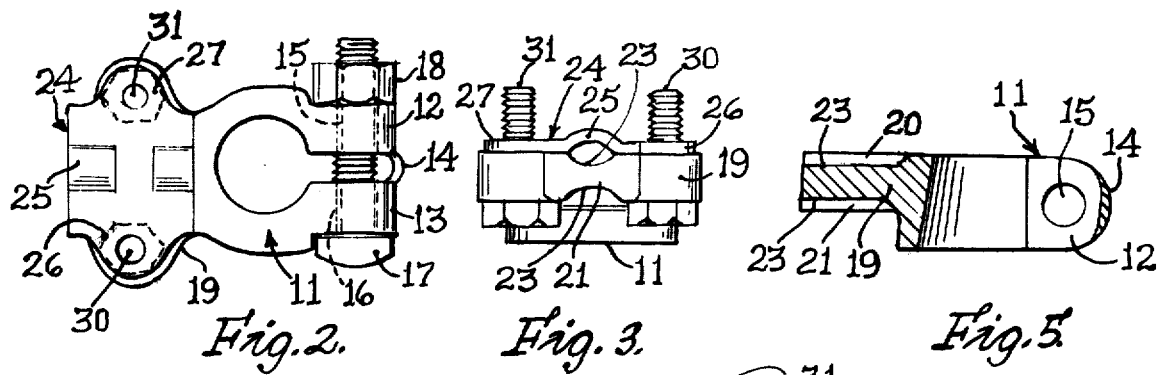
FIG. 2 is a top plan view of the improved battery terminal clamp.
FIG. 3 is an end elevational view of the improved battery terminal clamp.
FIG. 5 is a detailed sectional view of the battery clamp without its clamping plate or connecting bolt.
Figure 4:
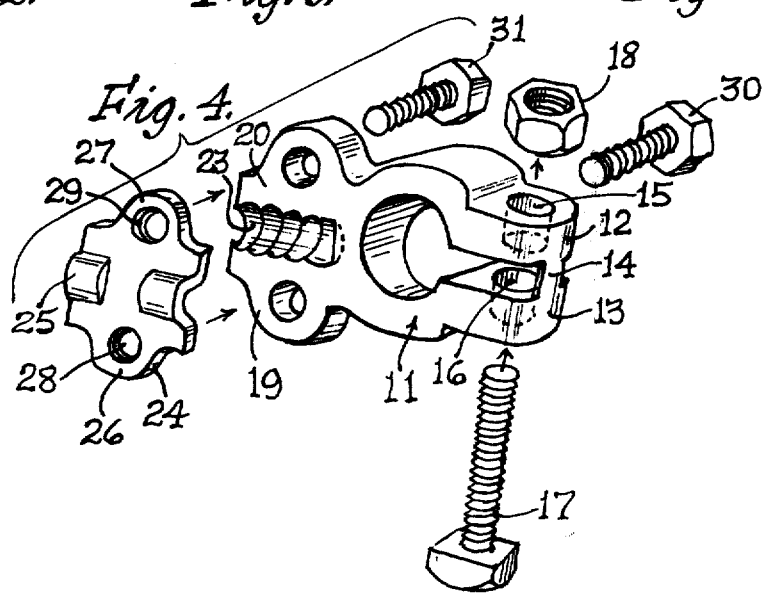
FIG. 4 is a perspective exploded view of the components of the improved battery terminal clamp.

The improved terminal clamp 10 includes a generally ringlike body 11 made from a highly conductive lead metal. The clamp 10 includes a pair of laterally extending clamping arms 12 and 13. The free ends of the arms 12 and 13 are joined together by a narrow strip of lead material or bridge 14, as viewed in FIGS. 1, 2 and 4. Each of the arms 12 and 13 are provided with aligned openings 15 and 16, respectively, through which a clamping bolt 17 projects. A suitable nut 18 is adapted to be threaded upon the clamping bolt 17 so as to tighten the circular body 11 upon a suitable battery terminal post (not shown). When the clamp 10 is tightened upon the battery post, the bridge 14 which connects the free ends of the arms 12 and 13, will, because of the pliable quality of the lead material, bow, as shown in FIGS. 1 and 2.

The clamp 10 provides a laterally extending, substantially flat tail portion 19, which is adapted to have its upper surface 20, as well as its lower surface 21, formed to provide semicircular grooves 22 and 23, respectively, adapted to receive the electrical cable (not shown). To secure the electrical cable to the clamp 10, there is provided a clamping plate 24. This plate 24 has a semicircularly raised middle portion 25 provided at either side by a pair of substantially flat apertured wings 26 and 27. The apertures 28 and 29 formed in the wings 26 and 27 are threaded so as to receive connecting bolts 30 and 31.

As it is desired to thread the connecting bolts 30 and 31 into the clamping plate, it is preferred that the clamping plate be made from a relatively hard but highly conductive metal. This is required because of the consistency of the lead from which the tail portion 19 of the clamp 10 is formed, which metal is semi-soft and pliable and not capable of threadably holding the connecting bolts 30 and 31.

In use, the laterally extending clamping arms 12 and 13 may be separated to the extent of the length of the bridge 14, which keeps the arms from being distorted or damaged prior to the attachment of the clamp 10 onto the battery terminal posts. When the clamp 10 is positioned on the post with its ringlike circular body 11 embracing the same, the clamping bolt and nut arrangement 17-18 is utilized to tighten the clamp 10 onto the post, the bridge 14 deflecting in an outwardly bowed position as best seen in FIG. 2. An electrical cable (not shown) is then placed in the upper grooved surface of the tail portion 19 of the clamp 10, with the clamping plate 24 positioned thereon and fastened thereto by having the bolts 30 and 31 projected through openings 32 and 33 formed in the tail portion 19 of the clamp 10 and threaded directly into the threaded apertures 28 and 29 provided by the clamping plate 24.

From the construction of the clamping plate 24 as heretofore described, it is apparent that no individual nuts are needed to be threaded upon the connecting bolts 30 and 31 for attaching the clamping plate 24 to the tail portion 19 of the clamp 10. This reduces the cost of the item and also effects a more efficient use of the clamping plate 24 in attaching the cable to the clamp 10 as is required.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by letters patent is:

1. A battery terminal clamp for connecting an electric cable to a battery post, comprising
    a. a ringlike body formed from a highly conductive inexpensive soft metal material,
    b. a pair of arms provided by said body and extending laterally therefrom in a normal spaced apart relation and providing axially aligned openings therethrough,
    c. a thin pliable narrow bridge extending between the free ends of said arms and spaced outwardly from said openings therein and deformable away from said openings upon relative movement of said arms toward each other when said ringlike body is connected onto the battery post,
    d. a flat tail portion extending laterally from said ringlike body in a direction opposite to said pair of arms, and providing a substantially flat top and bottom surface and having a pair of spaced openings formed therethrough to either side of coaxially extending semicircular grooves of different radii formed in said top and bottom surfaces of said tail portion, and e. a clamping plate connecting the electric cable to said body and provided with threaded apertures adapted to be aligned with said openings formed in said tail portion to threadably receive connecting bolts for attaching said clamping plate onto either side of said tail portion of said body with the electric cable therebetween.

* * * * *